United States Patent [19]
Wittwer

[11] 3,876,625
[45] Apr. 8, 1975

[54] PROCESS FOR THE MANUFACTURE OF COBALT-COMPLEX AZO COMPOUNDS

[75] Inventor: Christian Wittwer, Bottmingen, Basel, Switzerland

[73] Assignee: Ciba-Geigy AG, Basel, Switzerland

[22] Filed: July 12, 1972

[21] Appl. No.: 270,906

Related U.S. Application Data

[63] Continuation-in-part of Ser. No. 218,841, Jan. 18, 1972, abandoned, which is a continuation-in-part of Ser. No. 820,333, April 29, 1969, abandoned.

[30] Foreign Application Priority Data
May 14, 1968 Switzerland.......................... 7131/68

[52] U.S. Cl.......... 260/147; 260/146 R; 260/146 D; 260/146 T; 260/148; 260/149; 260/150; 260/151
[51] Int. Cl....................... C09b 45/20; C09b 45/34
[58] Field of Search........ 260/146 R, 146 D, 146 T, 260/147, 149, 150, 151, 148

[56] References Cited
UNITED STATES PATENTS
3,071,571   1/1963   Gross et al.......................... 260/151

*Primary Examiner*—Lorraine A. Weinberger
*Assistant Examiner*—C. F. Warren
*Attorney, Agent, or Firm*—Joseph G. Kolodny; Edward McC. Roberts; Prabodh I. Almaula

[57] ABSTRACT

Cobalt-complex azo dyestuffs, obtained by reacting a metallizable azo dyestuff with a cobalt (II) compound, can be obtained in improved yield by conducting the reaction in the presence of a nitrobenzene or nitronaphthalene compound, such as nitrobenzene sulfonic acid.

3 Claims, No Drawings

PROCESS FOR THE MANUFACTURE OF COBALT-COMPLEX AZO COMPOUNDS

CROSS-REFERENCES TO RELATED APPLICATIONS

This is a continuation-in-part application of our copending application Ser. No. 218,841, filed Jan. 18, 1972, now abandoned, which in turn was a continuation-in-part application of our application Ser. No. 820,333, filed Apr. 29, 1969, now abandoned.

This invention provides a simple process for the manufacture of 1:2 cobalt-complex azo dyestuffs by which higher dyestuff yields can be obtained than have hitherto been possible with the known methods.

Cobalt-complex azo dyestuffs are of importance in the dyeing and printing of natural and synthetic materials. They are generally produced by reacting cobalt (II) salts with azo dyestuffs in aqueous solution, the cobalt being oxidized to the trivalent state. However, due to side-reactions the yield of metal-complex azo dyestuff is 10 to 15% lower than the theoretical yield.

This invention is based on the surprising observation that this reduction in yield can be completely overcome by carrying out the metallization of the azo dyestuff in the presence of a nitro compound. The nitro compound is reduced to an amine in an alkaline medium in accordance with equation (1) in that Co(II) is converted into Co(III):

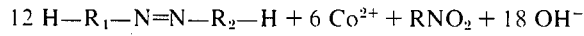

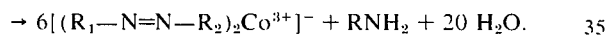

(1)

$R_1$ and $R_2$ represent respectively the residue of the diazo and coupling component of the azo dyestuff; the hydrogen atoms bound to $R_1$ and $R_2$ belong to complex-forming groups, for example, HO or $H_2N$ groups. As equation (1) shows, at least one oxidation equivalent of the nitro compound must be used to achieve complete oxidation of the cobalt. Thus, one-sixth mol per cobalt atom is required when a mono-nitro compound is used.

The nitro compounds used are mainly aromatic nitro compounds of the benzene or naphthalene series, especially those containing groups imparting solubility in water, for example, sulphonic acid, carboxylic acid or sulphonic acid amide groups, which may be N-substituted by $C_1$–$C_4$–alkyl, aryl, preferably phenyl, tolyl or methoxyphenyl, cyclohexyl or benzyl. The following are given as examples: -mono- or dinitrobenzene and especially ortho-, meta- or para-nitrobenzene sulphonic acid, ortho-, meta- or para-nitrobenzoic acid, meta-nitrobenzene sulphonic acid amide, meta-dinitrobenzoic acid, 3-nitronaphthoic acid(1), 6-nitrophthalic acid, 3,6-dinitronaphthoic acid(1), 3-nitronaphthalene-1-sulphonic acid, 3-nitronaphthalene-1-sulphonic acid amide, 6-nitronaphthalene-2-sulphonic acid, 3,6-dinitronaphthalene-1-sulphonic acid, 4-nitronaphthalene-1,7-disulphonic acid, 6-nitronaphthoic acid(1), 4-nitronaphthoic acid(2) and 5-nitronaphthoic acid(2).

It is advantageous to use meta-nitrobenzene sulphonic acid for industrial-scale production because it is readily available. Suitable complex-forming azo dyestuffs are those of the formula

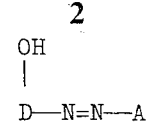

wherein D represents the residue of a diazo component of the benzene or naphthalene series, bound to the azo group in o-position to the hydroxy group and A is the residue of a coupling component of the phenol, naphthol, aminobenzene or naphthylamine series or of a ketomethylene compound, e.g. a pyrazolone, an acetoacetic acid amide dihydroxy-quinoline or barbituric acid, bound to the azo group vicinal to the hydroxy-, amino- or enolizable keto group.

The diazo component D contains one or several of the following substituents: sulfonic acid, carboxylic acid, lower alkyl, lower alkanoylamino and alkoxy carbonylamino, trifluoromethyl, chloro, bromo, nitro or carbonamido, sulfonamido and sulfone groups.

Suitable substituents of the coupling component A are e.g. lower alkyl, alkoxy, alkanoylamino and alkoxycarbonylamino, benzoylamino, halogen, preferably chlorine and bromine, sulfonic acid and sulfonic acid amide. The pyrazolones preferably contain a residue of the benzene series, e.g. phenyl or phenyl substituted by sulfonic acid nitro or chloro. The aceto acetamides may be lower alkylamides, cycloalkylamides, aralkyl- and especially arylamides, e.g. phenylamides. Preferably the diazo components correspond to the formula

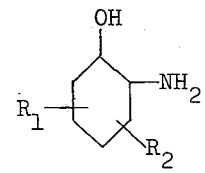

wherein $R_1$ is sulfonic acid, carboxylic acid, sulfonamide, carboxylic acid amide, lower alkyl sulfonamide, phenylsulfonamide, benzylsulfonamide, lower alkylsulfone, phenylsulfone, benzylsulfone, chloro, bromo, nitro, lower alkyl, lower alkanoylamino, or benzoylamino and $R_2$ is hydrogen, sulfonic acid, nitro, chloro, sulfonamide, lower alkyl-, phenyl- or benzyl-substituted sulfonamide or sulfone or the condensed benzene, nitrobenzene, sulfobenzene or chlorobenzene ring.

Examples of suitable diazo components are the following compounds:
2-aminophenol-4- or -5-sulphonic acid, 2-aminophenol-4- (or 5-)sulphonic acid amide and the corresponding methyl-, ethyl-, isopropyl-, n-butyl-, β-hydroxyethyl-, β-chloroethyl-, benzyl-, cyclohexyl-, phenyl-, p-chlorophenyl- or tolylamides, 2-aminophenol-4-carboxylic acid, 2-amino-4-nitrophenol, 2-amino-4-chlorophenol, 2-aminophenol-4,6-disulphonic acid, 1-amino-2-hydroxynaphthalene-4-sulphonic acid, 2-amino-5-nitrophenol, 6-acetylamino-4-nitro-2-aminophenol, 4,6-dinitro-2-aminophenol, 4,6-dichloro-2-aminophenol, 6-nitro-4-methyl-2-aminophenol, 6-nitro-4-acetylamino-2-aminophenol, 2-amino-4-(or 5-)methylsulfone-phenol, 2-amino-4- (or 5-)benzylsulfone-phenol, and 2-amino-4-carbonamide-phenol.

Suitable coupling components of the benzene series preferably correspond to the formula

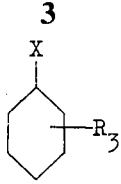

wherein $R_3$ is lower alkyl, lower alkoxy, lower alkanoylamino, benzoylamino, sulfonic acid or sulfonic acid amide, which may be N-alkylated, -arylated or -benzylated and —X is —OH or —NH$_2$.

The preferred coupling components of the naphthalene series are those of the formula

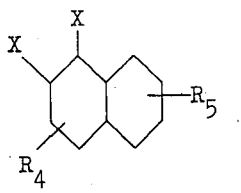

wherein one X is OH or NH$_2$ and the other is hydrogen and $R_4$ is hydrogen, lower alkyl, acylamino, sulfonic acid, sulfonic acid amide, N- lower alkylated-, cycloalkylated, benzylated or arylated sulfonamide and $R_5$ is hydrogen, lower alkyl, lower alkoxy, chloro, bromo, acylamino, sulfonic acid, sulfonic acid amide, N- lower alkylated, benzylated, cycloalkylated or arylated sulfonic acid amide. The term "acylamino" encompasses lower alkanoylamino, benzoylamino, lower alkoxy-carbonylamino and ureidyl and "lower" means "containing 1 to 4 carbon atoms". Cycloalkyl is preferably cyclohexyl and aryl means phenyl, tolyl and methoxyphenyl.

The preferred coupling components of the pyrazolone series are those of the formula

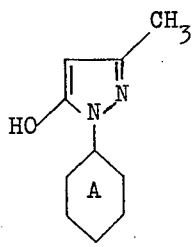

wherein the phenyl residue A is unsubstituted or substituted by chloro, nitro, sulfonic acid or sulfonic acid amide. Further suitable coupling compounds containing an enolized keto group are the acetoacetamides corresponding to the formula

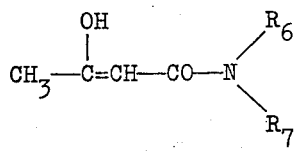

wherein $R_6$ and $R_7$ are each independently hydrogen, lower alkyl, lower alkoxy-loweralkyl, benzyl, β-phenylethyl, cyclopentyl, cyclohexyl, phenyl and phenyl substituted by lower alkoxy, lower alkyl, chloro or bromo. Among these compounds, the acetoacetic acid anilides are the preferred group.

The following are examples of useful coupling components:
para-cresol, 4-isobutylphenol, para-acetylaminophenol, 2-acetylamino-4-methylphenol, 2-hydroxynaphthalene, 2-aminonaphthalene, 6-bromo-, 6-methoxy- or 6-methyl-2-aminonaphthalene, 1-benzoylamino-7-hydroxynaphthalene, 8-chloro-1-hydroxynaphthalene, 1-acetylamino-7-hydroxynaphthalene, 2-amino- or 2-hydroxynaphthalene-4-, -5-, -6- or -7-sulphonic acid, 5-chloro-1-hydroxynaphthalene, 1-n-butyrylamino-7-hydroxynaphthalene, 1-carbomethoxy- or 1-carboethoxy-7-hydroxynaphthalene, 5,8-dichloro-1-hydroxynaphthalene, 2-aminonaphthalene-6-sulphonic acid amide, 2-aminonaphthalene-6-sulphonic acid-N-methylamide, 2-aminonaphthalene-6-sulphonic acid-N,N-isopropoxymethylamide, 1-aminonaphthalene-4-sulfonic acid-N-methylamide, 1-aminonaphthalene-5-sulfonic acid-N-methylamide, 1-aminonaphthalene-3-sulfonic acid-N-ethylamide, 1-phenyl-3-methyl-5-pyrazolone, 1-(2'-, 3'- or 4'-chlorophenyl)-3-methyl-pyrazolone, 1-(2'-chloro-4'- pr 5'-sulfophenyl)-3-methyl-pyrazolone, 1-phenyl-3-carbonamido-pyrazolone, 1-(3'- or 4'-sulfophenyl)-3-methylpyrazolone, acetoacetamide, acetoacetic acid-N-isopropyl-, -N-butyl-, -N,N-dimethyl-, -N,N-diethyl-, -N-methoxypropyl- or -N-benzylamide, acetoacetic acid-N-methyl or -N-ethylamilide, acetoacetylaminocyclohexane, acetoacetylaminobenzene, 1-acetoacetylamino-2,4-dimethoxybenzene, 1-acetoacetylamino-2,5-dimethylbenzene, or -dimethoxybenzene, 1-acetoacetylamino-2- or -4-ethylbenzene, 1-acetoacetylamino-2- or -4-chlorobenzene, 1-acetoacetylamino-2,5-dichlorobenzene, 1-acetoacetylamino-4-methyl- or methoxybenzene and 1-acetoacetylamino-2-methyl-3-chlorobenzene, barbituric acid and dihydroxyquinolines.

A group of important dyestuffs are e.g. the 1:2 cobalt-complexes of azo dyestuffs of the formula

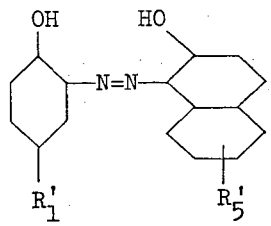

wherein $R'_1$ is sulfonic acid, carboxylic acid, sulfonamide, chloro, bromo or nitro and $R'_5$ is hydrogen or sulfonic acid.

Cobalt(II) compounds that are specially suitable for carrying out the process of the invention are those which are stable in an alkaline medium, for example, the cobalt salts of low-molecular, aliphatic hydroxy- or dicarbocylic acids which contain the cobalt bound in complex union. Examples of aliphatic hydroxycarboxylic acids are, inter alia, lactic acid, citric acid and, in particular tartaric acid, whereas oxalic acid is an example of a dicarboxylic acid. The preferred cobalt(II) compounds are simple cobalt salts, for example, cobalt sulphate, cobalt acetate or if desired, freshly precipitated cobalt hydroxide.

Conversion of the azo dyestuffs into cobalt complexes in accordance with the process of the invention is carried out in an aqueous alkaline solution of azo dyestuff, cobalt(II) compound and the requisite amount of nitro compound.

When the solution is well homogenized by stirring, the reaction in accordance with equation (1) is generally complete within a few hours when carried out at room temperature. If necessary, organic acids, for example, those mentioned above or the salts thereof, or other substances that assist the formation of the complex may be added to the reaction mixture. It is advantageous to use the azo dyestuff and the cobalt(II) compound in stoichiometric amounts in accordance with equation (1) and to use the nitro compound in at least a stoichiometric amount or in an excess, for example, about double that required theoretically. Metallization may be carried out in an open vessel or in a closed vessel with the exclusion of air. Demethylating metallization can be carried out in a closed vessel.

The cobalt-complex azo dyestuffs obtained in accordance with the new process are suitable for dyeing and printing a very wide variety of materials, especially for dyeing materials of animal origin, for example, silk, leather and especially wool, but they may also be used for dyeing and printing synthetic fibres made from polyamides, polyurethanes and polyacrylonitrile. They are mainly suitable for application in a weakly alkaline, neutral or slightly acid bath, for example, an acetic acid bath. The dyeings so obtained are level and possess good fastness to light, washing, milling, decatizing and carbonizing.

The water-insoluble cobalt complexes that are obtained which are soluble in organic solvents are suitable for colouring natural or synthetic resins, waxes, lacquers, paints and plastics compositions, for example, those made from cellulose ethers or esters. They may be used, for example, for the spin-colouration of cellulose acetate rayon, and for the colouration of natural and synthetic polymers or condensation products, if desired, by addition to spinning compositions thereof, and also for the manufacture of inks for ball-point pens.

The following Examples illustrate the invention, the parts and percentages being by weight, unless otherwise stated.

EXAMPLE 1

42.4 Parts of the azo dyestuff obtained from orthoaminophenol-4-sulphonic acid and 2-naphthol-6-sulphonic acid in 1000 parts of water are rendered alkaline in a closed vessel with 33.2 parts of 1ON sodium hydroxide solution and then 14.1 parts of cobalt sulphate crystals ($CoSO_4.7H_2O$) in 50 parts of water are added. 4 Parts of meta-nitrobenzene sulphonic acid (the theoretical amount required is 1.7 parts) in 50 parts of water are added and the batch is stirred for one hour. After the batch has been acidified to pH 5.8 with 26.5 parts of 9.7N hydrochloric acid, a yield of 100% is obtained.

A yield of 100% is also obtained by replacing the 4 parts of meta-nitrobenzene sulphonic acid with 2.75 parts of nitrobenzene and following the above procedure. The yield is only 89 to 90% when the above procedure is followed, but without the addition of the nitro compound.

EXAMPLE 2

4 Parts of meta-nitrobenzene sulphonic acid are added to 42.4 parts of the azo dyestuff obtained from ortho-aminophenol-4-sulphonic acid and 2-naphthol-6-sulphonic acid in about 800 parts of water. A 1ON sodium hydroxide solution and an M cobalt sulphate solution are then added simultaneously at room temperature, the pH being maintained at between 7 and 8. After the cobalt solution has been added, the pH is adjusted to 10.5. A total of 17.3 parts of 1ON sodium hydroxide solution and 14.1 parts of cobalt sulphate crystals ($CoSO_4.7H_2O$) is required. The yield amounts to 100%. When metallization is carried out at pH 7 to 8 without the addition of metanitrobenzene sulphonic acid, only 12.7 parts of cobalt sulphate enter into the azo dyestuff complex. The yield amounts to only 90%.

EXAMPLE 3

34.3 Parts of the azo dyestuff obtained from ortho-aminophenol-4-sulphonic acid amide and 2-naphthol are stirred in about 800 parts of water together with 33.2 parts of 1ON sodium hydroxide solution and 4.4 parts of sodium meta-nitrobenzens sulphonate. 14.1 Parts of cobalt sulphate crystals ($CoSO_4.7H_2O$), dissolved in 50 parts of water, are added at room temperature in a closed apparatus. The batch is kept at room temperature for 1 hour and then at 95°C for 3 hours, whereupon 100 parts of sodium chloride are added at 60°C. The dyestuff is then completely precipitated by neutralizing the batch to pH 7 at 60°C with 11.5 parts of 9.7N hydrochloric acid. The dyestuff is isolated by filtration, washed with 100 parts of water and then dried at 90°C under a pressure of 30 mm Hg. 40.9 Parts of dyestuff are obtained.

37 Parts of the dyestuff having the same tinctorial strength are obtained when the reaction is carried out as above, but without the addition of sodium meta-nitrobenzene sulphonate. The yield is thus increased by 10% by the addition of the nitro compound.

EXAMPLE 4

47.3 Parts of the azo dyestuff obtained from ortho-aminophenol-4-isopropoxypropyl sulphonic acid amide and 1-phenyl-3-methyl-5-pyrazolone are stirred at room temperature for half an hour in 1000 parts of water together with 33.2 parts of 1ON sodium hydroxide solution and 2.5 parts of metanitrobenzene sulphonic acid. A solution of 14.1 parts of cobalt sulphate crystals ($CoSO_4.7H_2O$) and 7 to 5 parts of tartaric acid in 120 parts of water made alkaline with 26.6 parts of 1ON sodium hydroxide solution, is then run in while stirring within 2 to 5 minutes. The cobalt(III)-azo dyestuff complex precipitates immediately in the form of fine crystals and can be further processed at once with excellent results.

When the metallization process is carried out in the above manner, but without the addition of a nitro compound, the cobalt(II)-azo dyestuff complex is generally obtained as a sticky, viscous mass that cannot be further processed with the usual adjuvants. When metallization is carried out at pH 7 to 9 without the addition of a nitro compound, the time required is considerable; 15 to more than 30 hours are required to complete the reaction.

In an identical manner the azo dyestuffs obtained from the diazo components listed in column I of the following Table and the coupling components listed in column II can be reacted with cobalt sulphate:

I claim:
1. In a process for the manufacture of a cobalt-complex azo dyestuff wherein a metallizable azo dyestuff is reacted with a cobalt (II) compound in aqueous alkaline solution, the improvement therein which comprises conducting said reaction in the presence of mono-or di- nitro-benzene or -nitro-naphthylene substituted by one or two of sulfo, carboxy, sulfamyl, and N-substituted sulfamyl, where said N-substitutent is lower alkyl, phenyl, tolyl, methoxyphenyl, benzyl, or cyclohexyl.

2. A process according to claim 1 in which the reaction is conducted in the presence of nitrobenzene sulfonic acid.

3. A process according to claim 2 in which the reaction is conducted in the presence of meta-nitrobenzene sulfonic acid.